United States Patent [19]
Casalta et al.

[11] 3,729,172
[45] Apr. 24, 1973

[54] ELECTRIC LINE TENSIONING APPARATUS

[75] Inventors: Jean Pierre Casalta, Mulhouse; Claude Dubs, Riedisheim; André Lechevallier, Ottmarsheim, all of France

[73] Assignee: Electricite de France (Service National), Paris, France

[22] Filed: Oct. 26, 1971

[21] Appl. No.: 192,066

[30] Foreign Application Priority Data

Oct. 27, 1970 France..........................7038701

[52] U.S. Cl.................254/67, 174/5 R, 174/138 R
[51] Int. Cl............................H02g 1/04, B25b 25/00
[58] Field of Search...............174/5 R, 40 R, 40 TD, 174/45 TD, 135, 138 R; 254/67, 134.3 R, 134.3 PA; 140/123.5; 256/37, 40, 42, 43, 44; 287/62

[56] References Cited

UNITED STATES PATENTS

| 908,325 | 12/1908 | Platts | 254/67 |
| 1,686,501 | 10/1928 | Hart | 254/67 |
| 3,346,236 | 10/1967 | Hubbard et al | 254/67 |

*Primary Examiner*—Laramie E. Askin
*Attorney*—Stevens, Davis, Miller & Mosher

[57] ABSTRACT

A tensioning apparatus for aerial electric lines which allows the replacement of a defective anchorage insulator without interrupting the electricity supply comprises a generally C-shaped frame connectable at its ends between a pylon or like support and the line and a screw-jack which itself is connected to a clamp on the line.

10 Claims, 5 Drawing Figures

Patented April 24, 1973 3,729,172
2 Sheets-Sheet 1
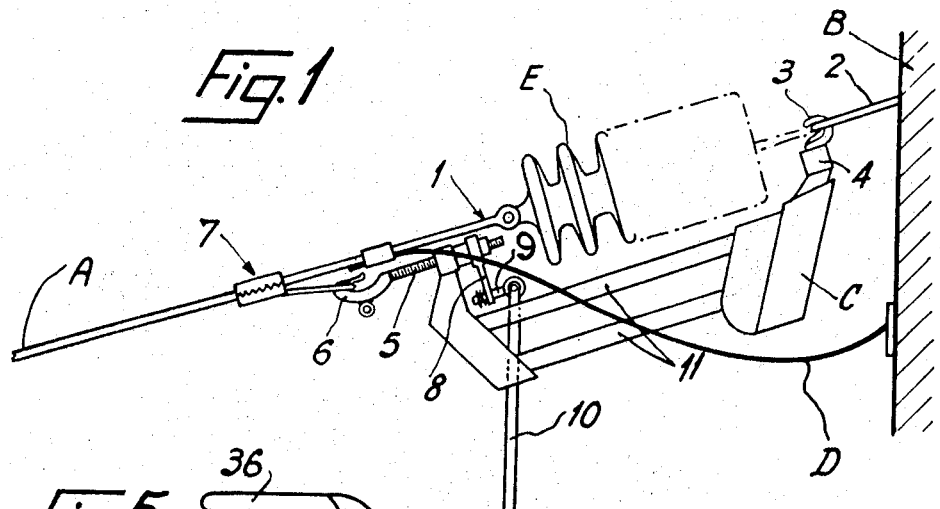
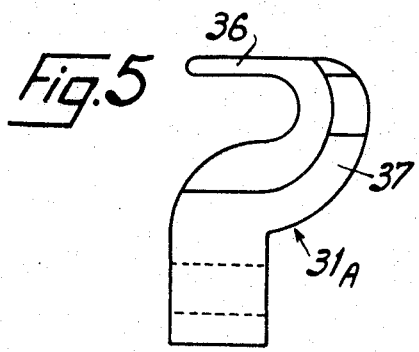
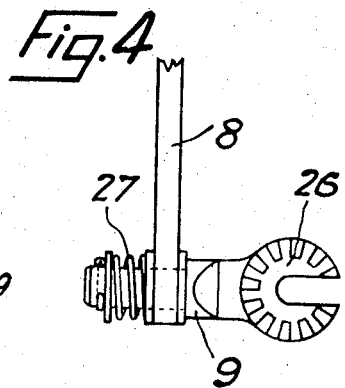
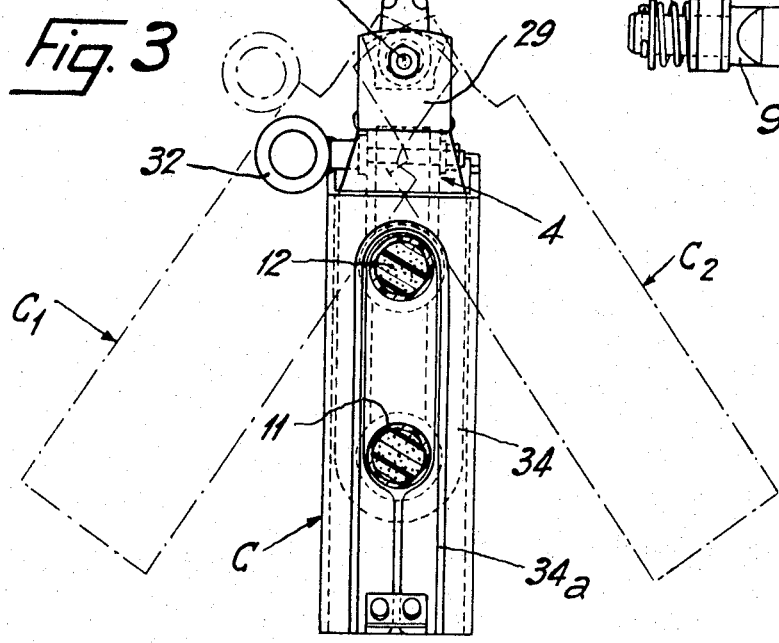

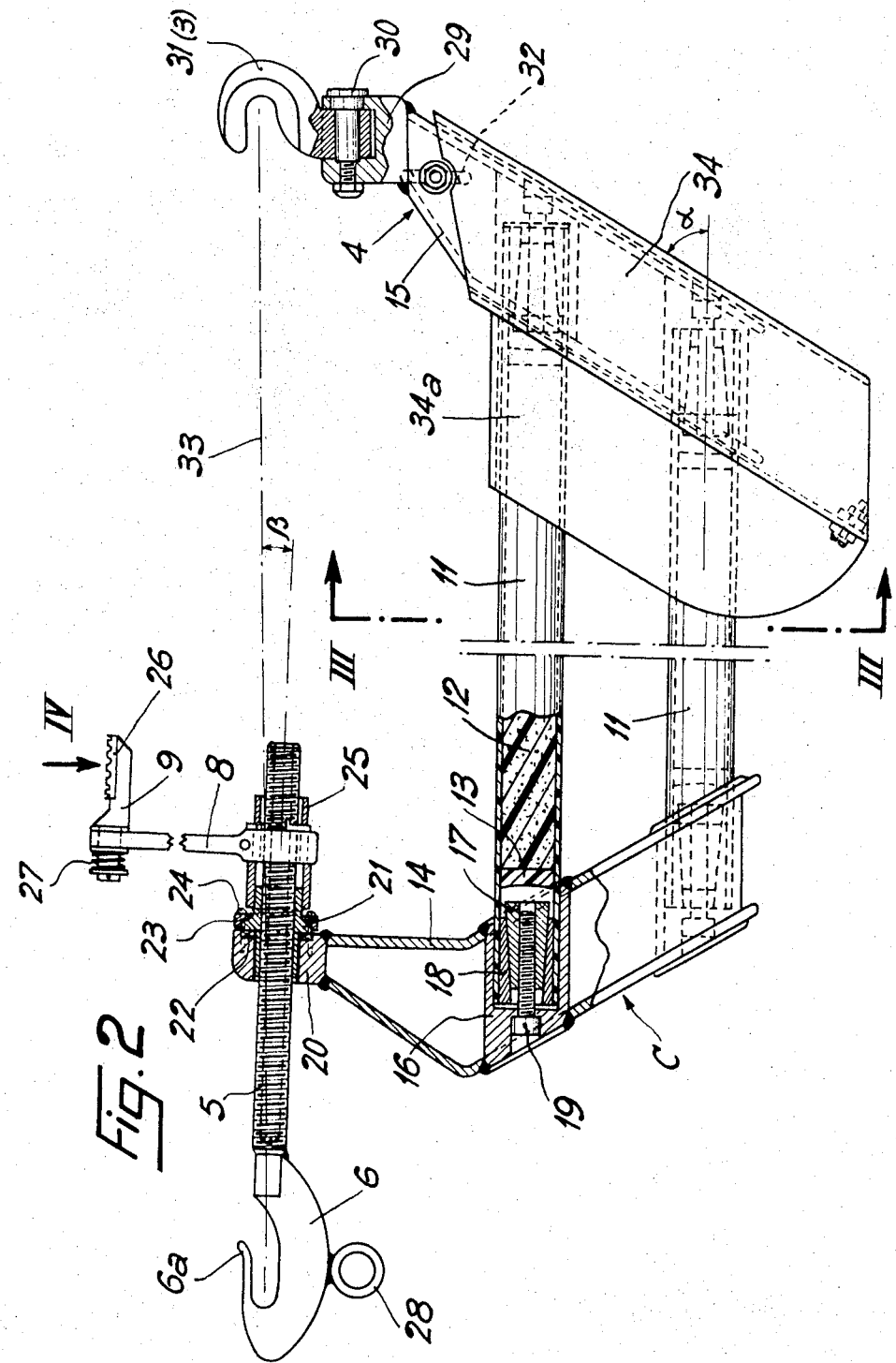

ELECTRIC LINE TENSIONING APPARATUS

FIELD OF THE INVENTION

This invention relates to a tensioning device for an electric line allowing the replacement of an anchorage insulator for this line on a pylon, post, building, girder or the like, all these bases merely being referred to as support in what follows, in the case of any weakness of the insulator already in place. The invention furthermore concerns a device for effecting this even when the line is in use without interrupting the distribution of electricity.

DESCRIPTION OF PRIOR ART

For putting in place such anchorage insulators there are currently used pulley blocks attached on the one hand to the line to be tensioned and on the other to the support.

For replacing an anchorage insulator it is necessary, in order to permit demounting of the insulator in place, to detension it completely. This is achieved by pulling a certain extension of the line conductor which is thus deformed. It is important in order not to alter the line to limit and control the deformation thus imposed. To this end, the tractive effort applied to the conductor should be effected along the axis of the conductor. Furthermore, the anchorage insulator should remain in place in its initial position, i.e., it should also be located along the axis of the line during the stretching thereof.

The use of a pulley is not satisfactory in these conditions because the pulley, owing to the fact that it is acting rectilinearly, must necessarily be remote from the insulator block, which prevents the pull being exercised along the axis of the line.

To avoid this disadvantage, it has been proposed in U.S. Pat. No. 1,940,162 to use as tractive device two parallel pullers enclosing the insulator block and connected at their ends by crossbars. Such a device is complex and is not very well adapted for use on relatively high voltage lines (45 to about 100 kV). This device furthermore can only be used with supports which can be embraced by the attachment means and it is not suitable for example for changing anchorages onto a masonry post.

There is also known from the U.S. Pat. No. 2,280,192 a simple device usable with wooden line posts or the transverse arms made of wood extending therefrom, which is essentially formed by a robust rectangular plank, along one edge of which a device for attaching to the line may be fixed while the opposite end of the plank comprises a lever associated with a screw-jack which engages by hooks onto the wooden part of the support allowing a traction to be exercised on the plank. The possibilities of use of such device are thus limited.

OBJECTS OF THIS INVENTION

It is an object of the present invention to provide a tensioning device for electric lines allowing the replacement of the anchorage insulators between the line and any support, particularly when the line is under voltage.

GENERAL DESCRIPTION OF THE INVENTION

The tensioning device according to the invention is characterized by being formed of a rigid frame generally in the form of an open C and elongated, the frame bearing at one end means for attachment to the anchorage point and at the other a tensioning screw-jack comprising a rod projecting substantially vertically from a joint at the ends of the C, the rod terminating in an attachment element which is beyond the end of the C and which is adapted to be attached to the line to be anchored.

Preferably the C-shaped frame is formed from two parallel tubes, insulating in the case of working under voltage and fixed at their ends to two divergent crosspieces bearing respectively the screw-jack and the means for attachment to the support.

The screw-jack is advantageously of a type in which the screw is associated with a ratchet and can be maneuvered from a distance by means of an insulating rod.

The C-shape of the frame of this device allows the exercising of traction on the line conductor along the axis thereof while maintaining, along this axis, the position of the anchorage insulator, the C-shape accommodating the anchorage insulator and not being encumbered by the diameter of this insulator.

In one highly advantageous form of the invention the means for attaching the device to the frame at the point of anchorage on the support can pivot on this frame about an axis substantially parallel to the line joining the ends of the said frame, while the other end of the frame, this can pivot about the rod of the screw-jack. In this way, the frame can be inclined with respect to the vertical plane in order to disengage the anchorage insulator to facilitate demounting the insulator which is unserviceable and remounting the new insulator.

SPECIFIC DESCRIPTION OF THE DRAWINGS

By way of example, the accompanying drawings show how the invention may be put into practice.

In the drawings:

FIG. 1 is a schematic view of an apparatus according to the invention used for the replacement of an anchorage insulator, FIG. 2 shows details of the device shown in FIG. 1, FIG. 3 is a section according to the lines III—III on FIG. 2, FIG. 4 is a view taken on the arrow IV of FIG. 2, and FIG. 5 shows a variant of a hook.

Referring to FIG. 1, the end A of an electric line is anchored to a support B of any type (e.g., pylon, post, building, transformer station, etc.) via an insulator E of which one end 1 is attached to the end of the line A and the other to a fixed device 2, which may be a stirrup, a "pigs tail" or a pulley frame, the attachment being effected by means of a hook, loop, etc. The electricity is fed to line A via an intermediate brace D which ends, for example, at a transformer station.

The device designed for allowing the replacement of insulator E comprises a frame designated as a whole by reference C which one end 4 is fixed by attachment means 3 to the fixture device 2, while the other end carries a screw-jack 5 ending in a hook 6 and provided with a device 7 known per se for fixing itself automatically onto the line A, for example, an apparatus of the type known as a "frog."

The screw-jack comprises a screw movable by means of a ratchet drive 8. This is driven by means of a crank 9 to which it is possible in known fashion to attach an insulating rod 10 in order to move the end thereof.

Because of the C-shape of the frame, the insulators E are accommodated in the cavity of the frame without displacing the elements thereof, in such fashion that a certain limited traction exercised on line A permits the detensioning of the chain of insulators E, without displacing its constituent elements, which facilitates its demounting and the later remounting of an insulator chain of identical or substantially identical length.

If as shown, the frame C is constituted in its middle part by insulating elements 11, for example by tubes, then a total electrical separation of the elements of the device situated on one side of the line and those which are attached to the support is effected, i.e., in such a fashion that the maneuvering of the device can be effective even when the line is under voltage.

Finally, on the side of the support, the portion of the frame connected to the attachment element 2 can be covered by an insulating protector 34, 34a, which avoids any contact risks of the strap D with that part of the device connected to ground.

The remaining figures clarify further the embodiment shown of the device.

In the device represented, the tubes 11 are tubes of epoxy resin strengthened with glass fiber and filled with polyurethane closed-cell foam which adheres to the resin. It is known that such a construction of the tubes provides and guarantees over a long while, a very high dielectric resistance. Plugs of epoxy resin 13 protect the polyurethane foam and constitute an additional protection against humidity finding its way into the interior of the tube.

In order to form the frame C, the two tubes are joined by divergent cross-pieces at their ends 14 at the line side and 15 at the side of the support, which are advantageously metallic hollow pieces of double I-section which are thus substantially empty in order to ensure their lightness. These pieces are crossed by tubular couplings 16 into which the ends of tubes 11 are fixed by means of a male-wedge 17 forced by means of a screw 19 into a female conical cleft 18 which is engaged in the tube. The cross-piece adjacent the support advantageously makes an angle $\alpha$ of the order of 60° with the direction of the tubes.

It will be remarked from the drawings that the upper tube is stretched by the traction effort applied to the frame while the lower tube is compressed. As a consequence, the fixture of the upper tube can be more robust than that of the lower tube and, to this end, the two male cones 17 corresponding to the upper tube are advantageously made of steel, while those for the lower tube may be made of plastics material, which again allows weight to be saved.

At the end of cross-piece 14 in the block 20 which is fixed thereto, the screw nut 21 turns which cooperates with the screw 5 to constitute the screw-jack. This screw nut bears on a ball or needle bearing 22 and it includes a brake 23 adjustable by screw 24. On this screw nut there is fitted a casing 25 which bears the ratchet 8.

For fixing the rod 10, the crank 9 comprises a notched sector 26 (FIG. 4) which allows the orientation of the rod 10 to be a matter of choice, since rod 10 carries a complementary sector with reference to the axis of the crank 9. Furthermore, the braking of the rotation of the crank 9 in the block for the ratchet which is ensured by the spring device 27, facilitates the placing of the casing 25 on the screw nut 21 when the whole of the key is carried on the end of the rod 10.

At this end of the device, a ring 28 welded to hook 6 permits by means of an insulated rod ending with an organ adapted to engage this ring, the engagement of the hook 6 in the ring of the "frog" 7 fixed on the conductor. The shape of this hook 6, particularly that of its end 6a, is determined to facilitate its engagement with such a ring.

At the end of the cross-piece 15 located on the side of the support, there is fixed a block 29 traversed by a support pivot 30 for a hook 31 constituting in particular the attachment means 3 which are designed to cooperate with the fixture device 2 which is attached to the aerial support B.

It will be noted (see FIG. 3) that the internal part of this hook is very flat in order to reduce to a minimum its encumbering the fixture device 2 (stirrup, pigs-tail, etc.) which permits the said hook to be engaged at the side of the fixing element of the insulator chain E on the device 2.

When the hook 31 cannot be used, it is possible to substitute it with other fixed pieces onto the frame C for fixing onto device 2 depending upon the particular form of that device.

FIG. 5 shows an example of hook 31A which may replace the hook 31. The end 36 is drawn out and flat, but as for hook 31A, the curvature is reinforced by an extra thickness 37 of the convex part.

The piece which is suitable for any particular attachment is put in place on frame C by fixing with the aid of a pin 30. As the frame can pivot about the block 20 of the screw 21, this pin 30 permits furthermore, as is clearly shown in FIG. 3, the frame C to be inclined either to the right or the left (positions C1 and C2 respectively) in a fashion to make the disengagement of the insulator chain E for demounting and its replacement easier.

The cross-piece 15 also carries a fixing ring 32 which likewise permits the device to be fixed by hook 31 or its equivalent to the device 2 likewise with the aid of an insulating rod.

In order to take account of the elastic deformation of the frame C when the tension is exercised by hook 6 on cable A the axis of the screw 5 should not be exactly in alignment 33 with the end of the frame, but should be inclined towards the interior of the frame at a small angle $\beta$.

Finally, the insulating protector insulating cross-piece 15 is a piece 34 moulded or hot-formed of plastics material which covers this cross-piece; this protector is elongated towards its base one part around the cross-piece and the other at 34a towards the tubes 11 in fashion to protect them, particularly in the case of rain, and to keep a sufficient difference for avoiding any contact between earth and the lash D. This protector can be formed of polyethylene.

In use of the apparatus, this being on the ground, first an appropriate attachment piece (hook 31) is chosen, which will be suitable for the fixture device 2, and this is fixed in the base 29 and the screw-jack is elongated to its maximum extent With the aid of a rod a "frog" or other cable gripping device is then fixed on cable A. The apparatus is then raised and fixed by hook 31 or its equivalent to the device 2 solidly to the aerial support B, the apparatus then being placed generally below the chain of insulators E to be replaced. However, in certain cases, it can be advantageous to place the apparatus above the insulator chain E.

The apparatus is then hooked with the aid of a rod onto the ring of the "frog" or other cable engaging device, after which the screw-jack is shortened by maneuvering the rod 10. After achieving the desired mechanical tension in the device, this is inclined, thanks to pin 30, into a position most favorable for the work and it keeps this position by virtue of the reaction of the tension. The insulator chain can then be demounted and replaced and the apparatus then demounted by reversing the series of operations.

Naturally the precautions of electrical insulation are useless in the case of work taking place on a line which is not under electrical voltage. The apparatus can furthermore, in such a case, be simplified by the use of metal tubes, the omission of the maneuvering rings 28 and 32, the omission of guard 34 and the direct manipulation of the ratchet key 8.

The invention is valuable to high voltage electrical lines particularly to lines which the voltage is less than 30 kV in which case, given the length of the insulation chain used for such voltages, the apparatus may be formed lightweight, i.e., have a weight between 5 and 8 kg and which for this reason is easily manipulated by insulating rods.

We claim as our invention:

1. A tensioning apparatus for anchoring electrical aerial lines to a support, comprising a rigid frame of substantially C-form, formed by two substantially parallel tubes, there being cross-pieces which diverge relative to each other, and which are connected to the ends of the tubes to constitute the ends of said C, attaching means at one end of the frame for attaching the frame to the support, a tension screw-jack at the other end of the frame, the screw-jack comprising a rod projecting substantially along the line joining the ends of the C-shaped frame, one end of said rod projecting beyond the frame and being in the form of an attachment member for attachment to the line to be anchored.

2. Apparatus according to claim 1 wherein the cross-piece at the end to be attached to the support forms an angle of about 60° with the tubes.

3. Apparatus according to claim 1 wherein the tubes are electrically insulating, and an electrically insulating guard is provided on the cross-piece located at the end to be attached to the support.

4. Apparatus according to claim 3 wherein the guard encompasses the length of the cross-piece and partially covers the tubes at the side of this cross-piece.

5. Apparatus according to claim 1 wherein each of the ends of the tubes is secured to the associated cross-piece by means of an expansion joint with a cone fixture.

6. Apparatus according to claim 1 wherein the rod of the screw-jack is a screw, there being a block at the end of the frame, a screw nut adapted to turn in said block receiving said screw.

7. Apparatus according to claim 1 wherein the attaching means for attaching to the support are fixed to the frame by way of a pin the axis of which is parallel to the said line joining the ends of the C so as to permit pivotal oscillation laterally of the frame about the pin.

8. Apparatus according to claim 7 wherein the attaching means is a hook flattened in plan and in its concave part and reinforced on its convex side.

9. Apparatus according to claim 8 wherein the hook comprises a rectilinear fixed extremity.

10. Apparatus according to claim 1 wherein the rod of the screw-jack is at a slight re-entrant angle, directed towards the interior of the frame, with respect to the line joining the ends of the frame.

* * * * *